(12) United States Patent
Durning et al.

(10) Patent No.: US 6,898,917 B2
(45) Date of Patent: May 31, 2005

(54) AVOIDING CRACKING AND CURLING IN CONCRETE FLOORING UPON WHICH WATER-BASED ADHESIVES ARE EMPLOYED

(75) Inventors: Timothy A. Durning, Arlington, MA (US); Lawrence R. Roberts, Acton, MA (US); Neal S. Berke, N. Chelmsford, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 343 days.

(21) Appl. No.: 10/219,107

(22) Filed: Aug. 15, 2002

(65) Prior Publication Data

US 2004/0031223 A1 Feb. 19, 2004

(51) Int. Cl.⁷ .............................. E04B 5/32; C04B 24/00
(52) U.S. Cl. .................... 52/746.1; 52/742.14; 52/409; 52/411; 106/802; 106/819; 428/489
(58) Field of Search ......................... 52/309.17, 309.12, 52/403.1, 411, 408–409, 741.41, 742.14, 746.1, 309.13, 747.11; 106/724, 802, 819, 823, 829; 428/489; 156/332, 337, 71, 41; 524/5

(56) References Cited

U.S. PATENT DOCUMENTS

| | | | |
|---|---|---|---|
| 3,663,251 A | 5/1972 | Moren et al. | 106/90 |
| 3,853,682 A * | 12/1974 | Hurst | 428/40.3 |
| 4,233,356 A * | 11/1980 | Jacobs | 442/37 |
| 4,547,223 A | 10/1985 | Goto et al. | 106/90 |
| 4,994,328 A | 2/1991 | Cogliano | 428/489 |
| 5,145,748 A | 9/1992 | Gaidis et al. | 428/489 |
| 5,316,848 A | 5/1994 | Bartlett et al. | 428/351 |
| 5,326,397 A | 7/1994 | Abdelrazig et al. | 106/808 |
| 5,393,343 A | 2/1995 | Darwin et al. | 106/808 |
| 5,399,195 A | 3/1995 | Hansen et al. | 106/711 |
| 5,413,634 A | 5/1995 | Shawl et al. | 106/696 |
| 5,496,615 A | 3/1996 | Bartlett et al. | 428/144 |
| 5,543,188 A * | 8/1996 | Te'eni | 428/36.6 |
| 5,556,460 A | 9/1996 | Berke et al. | 106/823 |
| 5,603,760 A | 2/1997 | Berke et al. | 106/802 |
| 5,604,273 A | 2/1997 | Kerkar et al. | 524/4 |
| 5,618,344 A | 4/1997 | Kerkar et al. | 106/823 |
| 5,622,558 A | 4/1997 | Berke et al. | 106/802 |
| 5,626,663 A | 5/1997 | Berke et al. | 106/696 |
| 5,679,150 A | 10/1997 | Kerkar et al. | 106/808 |
| 5,753,368 A | 5/1998 | Berke et al. | 428/375 |
| 5,779,788 A | 7/1998 | Berke et al. | 106/809 |
| 5,938,835 A | 8/1999 | Shaw et al. | 106/724 |
| 6,071,613 A | 6/2000 | Rieder et al. | 428/278 |
| 6,167,668 B1 | 1/2001 | Fine et al. | 52/403.1 |
| 6,187,382 B1 | 2/2001 | Lightcap, Jr. | 427/384 |
| 6,372,038 B1 | 4/2002 | Kameta et al. | 106/724 |

OTHER PUBLICATIONS

"Drying of Construciton Water in Concrete", Hedenblad Lund, 1996 pp. 1–54.
"Florprufe 120", Grace Construction Products, Apr., 2002.
"Florprufe", Grace Consruction Products, Jun., 2002.

* cited by examiner

Primary Examiner—Winnie Yip
(74) Attorney, Agent, or Firm—Craig K. Olson; William L. Baker

(57) ABSTRACT

The invention provides a method for making a concrete floor slab using sub-grade waterproofing in a manner that favors the use of water-based adhesives for affixing floor covering materials. The method comprises casting a hydratable cementitious composition onto a flooring membrane, the composition having a shrinkage reduction admixture and a water:cementitious binder ratio sufficiently low that substantially all of the water moisture is retained in the hydration reaction, and achieving a fully adhered bond with the flooring membrane.

20 Claims, 1 Drawing Sheet

AVOIDING CRACKING AND CURLING IN CONCRETE FLOORING UPON WHICH WATER-BASED ADHESIVES ARE EMPLOYED

FIELD OF THE INVENTION

The present invention relates to a method for making a concrete flooring structure that facilitates rapid application of water-based adhesives while minimizing or preventing cracking and curling stresses.

BACKGROUND OF THE INVENTION

The building materials industry is favoring the use of water-based adhesives for adhering floor coverings, such as carpet, tile, wood, epoxy, etc., onto the top surface of concrete floor slabs. This switch is partly caused by a need to avoid adhesives that are based on volatile organic compounds (VOC) and their attendant risks to health. Along with the benefits provided by water-based adhesives, there is both a short term problem and a long term problem.

A short-term problem arises due to the fact that a substantial amount of moisture evaporates from the concrete floor slab after it is cast. This prolongs the time before the water-based adhesive can be applied onto the surface of the floor slab. It is recognized in the flooring industry that water vapor emissions should be below 5 pounds/1000 square feet/24 hours, and preferably below 3 pounds/1000 square feet/24 hours, before a water-based adhesive coating is applied. For concrete typically used in floor slabs, it will usually take 60–90 days before this level of vapor transmission is achieved.

A long-term problem arises due to the fact that cured concrete is not impervious to water vapor transmission. Consequently, a coating of water-based adhesive (e.g., rubber latex, vinyl acetate, polyacrylate, etc.) applied onto the top of the floor slab can fail over time if the environment below the slab becomes saturated with moisture. Such saturation may occur due to water table fluctuations or other environmental causes.

To resolve the long term problem, most industry experts (such as the American Concrete Institute) have begun to recommend that floor slabs be placed directly on top of a vapor barrier membrane. However, current practice is simply to place concrete onto a liner sheet (e.g., polyethylene). This liner sheet does not bond with the concrete, and has a potential failure mode whereby water or vapor passes between adjacent liner sheets at the overlap, or through punctures in the liner sheets. This water or vapor can then spread out between the liner sheet and the concrete over a wide area, especially if local settlement of the subgrade occurs. In providing an advantage over simple liner sheets (e.g, vinyl sheet), self-adhered vapor barrier membranes have a waterproofing adhesive layer that is operative to bond with concrete that is wet cast against the adhesive layer, so as to form a continuous waterproofing bond.

Thus, while placement of concrete directly upon a self-adhering vapor barrier membrane can solve the long-term problem of water leakage, the present inventors realized that the short-term problem may be exacerbated by the use of membranes. The placement of a vapor barrier membrane between the sub-grade environment and the concrete floor slab means that excess water in the concrete will not be able to escape into the sub-grade environment; but, rather, will be forced to evaporate out of the top surface of the concrete floor slab as it dries. This can result in longer waiting periods before a water-based adhesive coating can be applied onto the upward facing floor slab surface, and may delay completion of the project. Moreover, the fact that the slab dries from only one surface rather than from both the bottom and top surfaces creates a moisture gradient within the concrete slab that may cause the slab to curl. This curling phenomenon increases the risk of cracking and can lead to serviceability problems when the floor is no longer flat.

Accordingly, the present inventors believe that a novel concrete flooring system and method for making the flooring are needed.

SUMMARY OF THE INVENTION

In surmounting the above-described disadvantages, the present invention provides a method for making a concrete flooring structure. This involves applying a flooring membrane over a substrate, such as soil, rocks, or ground, then casting a hydratable cementitious composition having a low water/cementitious binder ("W/C") ratio and having a shrinkage reduction admixture (SRA) onto the flooring membrane, and allowing the composition to bond to, and form a slab upon, the flooring membrane. Subsequently, a water-based adhesive coating is applied onto the formed slab before application of a floor covering (e.g., carpet, tile, vinyl or rubber sheet, etc.), either as a separate sprayed or liquid-applied coating, or as a pressure-sensitive adhesive layer that is pre-formed on the floor covering.

The W/C ratio of the cementitious composition should be sufficiently low that the cement hydration reaction binds substantially all of the internal moisture when the floor slab is cast, thereby achieving a low water vapor transmission rate in minimal time. However, while the use of low W/C ratios is known in the concrete industry generally, it is difficult to use low W/C ratios in slab-on-grade flooring applications. This difficulty is due to the fact that concrete having a low W/C ratio is prone to thermal and shrinkage cracking. Since cracking is common in concrete floors, the use of a low W/C ratio concrete is not considered a suitable solution to the water vapor transmission issue.

Accordingly, the above-described method of the present invention involves a hydratable cementitious composition comprising a hydratable cementitious binder; at least one shrinkage reducing admixture (SRA) in an amount of 0.05% to 5.0% based on dry weight of the cementitious binder; and water in an amount whereby the composition has a water-to-cementitious-binder (W/C) ratio of 0.20 to 0.45 by weight, preferably such that the composition when cast into a floor slab and allowed to cure has a water vapor transmission rate of 3 pounds/1000 square feet/24 hours at 28 days after casting of the concrete floor slab. Optionally, but preferably, the composition further comprises at least one water reducing admixture (e.g., sodium lignosulphonate, salts of lignosulfonic acids and calcium chloride) or a high-range water reducer known as a superplasticizer (e.g., a polycarboxylate polymer or comb polymer, a sulfonated melamine-formaldehyde condensation product, a sulfonated naphthalene-formaldehyde condensation product) in the amount of 0.05–5.0% based on dry weight of the hydratable cementitious binder in the composition.

Fibers for reinforcing or plastic shrinkage control may also be included as an optional but preferred admixture in the hydratable cementitious composition used for casting the floor slab.

A concrete floor slab assembly provided by the foregoing method is also further described and claimed hereinafter. Further advantages and features of the invention are described in further detail hereinafter.

BRIEF DESCRIPTION OF THE DRAWINGS

The following detailed description can be more readily comprehended when considered with the appended drawings, wherein.

DETAILED DESCRIPTION OF PREFERRED EMBODIMENTS

Figure 1:
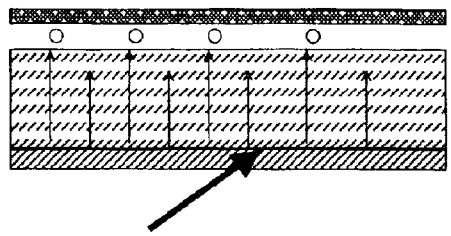
FIGS. 1–2 are partial cross-sectional diagrams of PRIOR ART concrete flooring structures wherein concrete is placed onto a non-self-adhering liner sheet.

As shown in FIG. 1 (prior art), a concrete floor having a high water/cement (W/C) ratio is cast onto a non-adhered sheet liner (e.g., plastic). Water seeping between the overlaps of the plastic liner (which is usually laid down as overlapping strips from a roll) or through puncture holes (represented by the large arrow slanted towards the upper right corner of the page) migrates laterally across the base bottom surface of the slab (between slab and plastic liner) and upwards transversely through the slab, resulting in significant delamination of the water-based adhesive and covering layers (which are both depicted as one uppermost layer in FIG. 1). The small circles on top of the concrete slab represent water accumulated at the top of the slab due to transverse migration of moisture through the slab. A higher concentration of water at the slab base may lead to lengthening of the base, resulting in curling stress. In floor slabs having a high W/C ratio, the moisture at the top and base of the slab may be similar, such that curling is not a significant issue.

Figure 2:
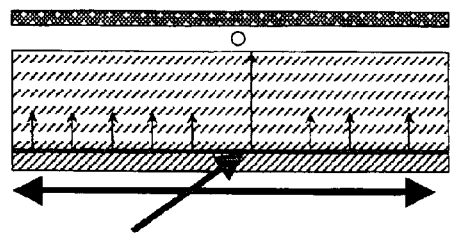

As shown in FIG. 2 (prior art), a concrete floor slab having a low W/C ratio is cast onto a non-adhered liner sheet. Water seeping between overlaps of the plastic sheet or through puncture holes (represented by the large arrow slanted towards the upper right corner of the page) migrates laterally across the slab base bottom surface. While the low W/C/ratio of the concrete slab hinders migration of moisture transversely (upward) through the slab, the low W/C ratio also can lead to cracking; and water travels quickly upward through the crack and creates localized but significant delaminations of the covering material at the top. The higher moisture content in the base of the slab leads to lengthening of the base, and hence greater curling stress (represented by the thick horizontal arrows pointing in opposite directions).

Figure 3:
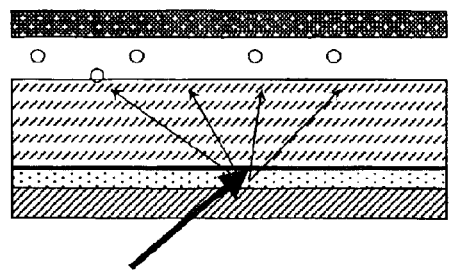
FIGS. 3–4 are partial cross-sectional diagrams of PRIOR ART concrete flooring structures wherein concrete is placed onto a self-adhering flooring membrane.

As shown in FIG. 3 (prior art), a concrete floor slab having a high W/C ratio is cast onto a self-adhering waterproofing flooring membrane (e.g., one having a pressure-sensitive adhesive layer attached to a carrier sheet). Such self-adhering membranes are typically seamed at the overlaps (e.g., by lapping the waterproofing adhesive onto the back of the carrier sheet, by taping, by separate additional application of adhesive, or other means) such that the only water that can seep across is due to a puncture or flaw in the membrane (represented by the large arrow slanted towards the upper right corner of the page). Nevertheless, water seeping through a puncture can not migrate laterally between the membrane and floor slab; but water moisture does travel transversely through the slab due to the high W/C ratio and can lead to visible delamination of the floor covering. Curling is unlikely to occur, since the moisture can migrate to the top just as easily as it can to locations adjacent to the penetration along the base of the slab.

Figure 4:
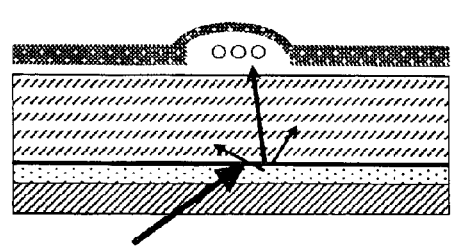

As shown in FIG. 4 (prior art), a concrete floor having a low W/C ratio is cast onto a self-adhering waterproofing membrane (having pressure-sensitive adhesive layer attached to a carrier sheet). Water seeping through a puncture or flaw in the membrane (represented by the large arrow slanted towards the upper right corner of the page) is hindered by the low W/C concrete, and water moisture can migrate transversely through the floor slab only through cracks. Hence, delamination of the floor covering tends to be localized in this situation (e.g., water moisture illustrated by the small circles tend to form "blisters" in the floor covering). Moisture at the slab base is also highly localized, due to the low W/C ratio, such that curling stresses are insignificant.

Figure 5:
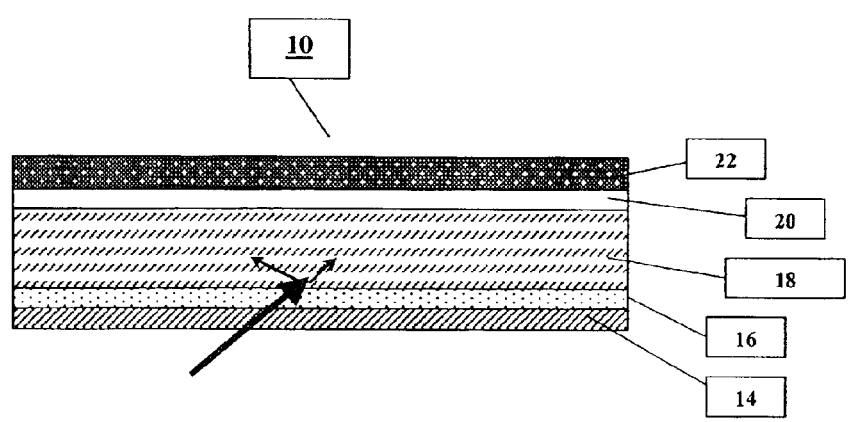
FIG. 5 is a partial cross-sectional diagram of an exemplary concrete flooring structure of the present invention wherein an exemplary floor slab composition of the invention is cast onto a self-adhering flooring membrane.

An exemplary flooring structure 10 of the present invention, which minimizes cracking and curling stresses at the slab base, is illustrated in the partial cross-sectional view shown in FIG. 5. The low W/C ratio of the concrete slab 18 and the use of the self-adhered flooring membrane having a carrier sheet 14 and waterproofing adhesive layer 16 means that water can not easily migrate laterally from a puncture or flaw in the membrane, so must migrate locally through the concrete. If no crack is encountered, no delamination can occur. Moreover, moisture at the slab base is highly localized due to the low W/C ratio, such that curling stresses are insignificant.

Accordingly, the present inventors claim a flooring structure 10 comprising a flooring membrane with a continuous carrier sheet layer 14 and waterproofing adhesive layer 16 that is contiguous (attached) and/or coextensive therewith. The flooring membrane can be made "continuous" by overlapping the adhesive layer 16 onto the carrier sheet 14, as is known in the art, to form a continuous waterproofing membrane (i.e., from rolled sheet strips of membrane); or, alternatively, adjacent membrane sheet strips can be taped together (or seamed using any other means known) to form a continuous moisture and vapor barrier. The waterproofing adhesive layer 16 may be directly attached to the carrier sheet 14 or separated by another layer (e.g., a reinforcing scrim). The flooring membrane 14/16 is placed upon a subgrade environment such as earth, soil, rocks, etc. (not shown) upon which a hydratable cementitious composition 18 is cast. Typically, the cured slab thickness is about 50 mm to 250 mm or more) and allowed to harden into a floor slab. This flooring structure 10 is suitable for rapid application thereupon of a water-based adhesive as soon as 14 days after concrete placement, which is considerably sooner than the usual 60–90 days as seen in current practice. By lowering the water/cementitious binder ratio of the hydratable cementitious composition 18, one may decrease the time required between concrete placement 18 and application of water-based adhesive 20 and covering layer 22 (e.g., carpet, rug, tile, linoleum, plastic sheeting, etc.) over the flooring structure 10.

Exemplary flooring membranes 14/16 contemplated for use in the present invention generally comprise: at least one carrier sheet 14; one or more waterproofing adhesive layer (s) 16 which are preferably of the pressure-sensitive adhesive variety that is typically used in the waterproofing industry; and optionally but preferably a granular layer (not shown) having sand or other mineral particles in range of 1–1000 microns average diameter) that is resistant to foot traffic but permits concrete to bond mechanically with the waterproofing adhesive layer 16. Exemplary carrier sheets 14 comprise a continuous film layer that can be made of conventional materials such as a polyolefin (e.g., polyethylene, polypropylene, or mixture thereof), polyester, a metal (e.g., aluminum), or mixtures thereof. The carrier sheet preferably has a thickness of 1–15 mils. A cross-laminated low-density polyethylene film, 2–4 mils average thickness, is most preferred. The waterproofing adhesive layer or layers 16 may comprise a modified bitumen or synthetic adhesive (e.g., having an average thickness of 2–60 mils.

Accordingly, an exemplary method of the present invention for making a concrete floor structure, comprises: applying onto a substrate having a horizontal upward-facing surface a waterproofing membrane 14/16 having a carrier sheet 14 having two major sides and a waterproofing adhesive layer 16 disposed on at least one of the two major sides thereof, whereby the waterproofing adhesive layer side 16 is disposed in an upwards direction when the membrane 14/16 is applied onto the substrate; casting a hydratable cementitious composition 18 having a hydratable cementitious binder and water onto the waterproofing adhesive layer 16 side of the waterproofing membrane and allowing the composition to bond to and form a horizontal slab 18 upon the membrane 14/16, the cementitious floor slab 18 composition comprising: at least one shrinkage reducing admixture in an amount of 0.05%–5.0% based on dry weight of the cementitious binder; and the hydratable cementitious binder and water being in water/cementitious binder ratio of 0.20–0.45 based on dry weight.

Most preferred flooring membranes 14/16 are called "blind side" waterproofing membranes that are designed to bond with concrete cast against them. Such membranes are disclosed, for example, in U.S. Pat. No. 4,994,328 of Cogliano; U.S. Pat. No. 5,316,848 of Bartlett et al.; and U.S. Pat. No. 5,496,615 of Bartlett et al.; which are owned by the common assignee hereof and incorporated by reference herein. In U.S. Pat. No. 5,316,848, Bartlett et al. disclosed a synthetic (non-bituminous) adhesive layer having a penetration greater than 30 dmm (150 g. 5 sec., 70° F.) according to ASTM D 5-73 and comprising material selected from butyl rubber based adhesives, polyisobutylene based adhesives, polyisobutyl based adhesives, acrylic based adhesives, vinyl ether based adhesives, styrene-isoprene-styrene based adhesives, styrene-ethylene-butylene-styrene based adhesives, and styrene-butadiene-styrene-based adhesives. As another example, in U.S. Pat. No. 5,496,615, there was disclosed in combination with a synthetic adhesive (e.g., SIS) and elastomeric protective coating layer (e.g., acrylic) a finely divided particulate layer for resisting foot traffic while permitting concrete to be cast onto the adhesive and protective coating layers so as to bond mechanically with the adhesive layer. Preferred particulate layers may comprise any material known, and can be sized in an average particle size range of 1–1000 microns. Sand particles are preferred.

Further exemplary flooring membranes 14/16 may further employ granules that are chemically reactive with the cement, concrete, or mortar that is cast upon the membrane 14/16. Such particles include aluminum oxide trihydrate (preferably having a spherical particle shape), pozzolanic materials (such as fly ash or granulated blast furnace slag), cement set accelerating additives such as alkali or alkaline earth metal salts (e.g., calcium nitrate), and mixtures thereof. For example, in EP 1 193 283 A1, Wiercinski and Seth disclosed membranes and articles having a coating of inorganic particles that are reactive with the hydroxide generated from the hydration reactions in concrete.

Waterproofing membranes are known which have a non-woven surface or a "fuzzy" surface (ie. Threadlike projections of polymeric material jutting from plastic film surface) for bonding with wet concrete cast against the surface, but these are less preferred. In contrast to the use of a waterproofing adhesive layer 16, as previously described above, such "fuzzy" membranes do not often provide protection against lateral water migration, whereby moisture leaking through a hole or puncture at one point of a liner sheet can travel laterally between the sheet and concrete slab to a crack located in the concrete some distance from the hole or puncture. Accordingly, the use of a pressure-sensitive waterproofing adhesive layer 16 is preferred because this is the best protection against lateral water migration.

Exemplary hydratable cementitious compositions used for making the concrete flooring slab 18 generally comprise water and a hydratable cementitious binder (usually, but not exclusively, Portland cement, masonry cement, or mortar cement and this may also include fly ash, granulated blast furnace slag, silica fume, metakaolin clay, or other materials commonly included in such cements). Cementitious compositions suitable for use in the invention may also include a fine aggregate such as sand and/or a coarse aggregate such as gravel or crushed stones. The cementitious compositions tested in this invention are formed by mixing the binder, and fine and/or coarse aggregate, as may be applicable to make the particular cementitious composition being formed.

As previously mentioned, the hydratable cementitious composition 18 has a water to cementitious binder ratio of 0.20 to 0.45, and more preferably 0.25 to 0.40, and most preferably 0.25–0.35, such that the water in the composition 22 is sufficiently bound up during the hydration reaction, whereby the vapor transmission rate is equal to or less than 3 pounds/1000 square feet/24 hours at 3–90 days after concrete placement, and more preferably at 7–56 days after concrete placement.

Exemplary hydratable cementitious compositions of the present invention include the above-described cementitious binder and at least one shrinkage reducing admixture (SRA) in the amount of 0.05 to 5.0%, and more preferably 0.5 to 2.5%, by weight based on dry weight of the hydratable cementitious binder. The SRA overcomes the high early shrinkage of the low W/C ratio concrete and mitigates its crack propensity, thereby facilitating the flooring installation. The SRA also compensates for the increased tendency for slab curling due to the use of the bonding flooring membrane. Exemplary shrinkage reduction admixtures (SRA) suitable for use in the invention include SRAs containing oxyalkylene groups. Such SRAs are generally known in the industry. See e.g., U.S. Pat. No. 5,326,397 of Abdelrazig et al. (alkyl or cycloalkyl carbamate, an alkylene dicarbamate, polyoxyalkylene dicarbamate, or mixtures thereof); U.S. Pat. No. 5,413,634 of Shawl et al. (SRA comprising alkyl ether derivative of aliphatic polyhydroxy compound); U.S. Pat. No. 5,603,760 of Berke et al. (oxyalkylene SRA comprising an oxyalkylene compound selected from (i) an oxyalkylene glycol or (ii) oxyalkylene ether adduct of an alcohol, glycol, or glycerol; and an ammonium salt of tall oil fatty acid); all of which are incorporated by reference herein.

Exemplary oxyalkylene shrinkage reduction admixtures (SRAs) which are also believed suitable include alkyl ether derivatives of aliphatic polyhydroxy compounds such as glycerin. Dialkyl ether derivatives, especially tertiary butyl ethers of glycerin are preferred. An especially preferred SRA is di-propylene glycol tertiarybutyl ether, combined with di-propylene glycol, which is available from Grace Construction Products, Cambridge, Massachusetts, under the trade name ECLIPSE™.

Other exemplary SRAs are disclosed in U.S. Pat. Nos. 3,663,251 and 4,547,223, incorporated herein by reference, which disclose compounds having the general formula $RO(AO)_nH$ in which R may be a $C_1$–$C_7$ alkyl or $C_5$–$C_6$ cycloalkyl radical, A may be a $C_2$–$C_3$ alkylene radical, and n is 1–10, as shrinkage reducing additives for cement. These are also believed suitable for use as an exemplary admixture in the present invention.

A further oxyalkylene SRA suitable for use in the invention is disclosed in U.S. Pat. No. 5,556,460 of Berke et al., which is incorporated herein by reference. Berke et al. disclosed an SRA admixture comprising a low molecular weight oxyalkylene compound and a comb polymer having carboxylic acid groups and oxyalkylene units therein. More particularly, such an exemplary SRA comprises: (A) at least one oxyalkylene glycol, oxyalkylene ether glycol or mixtures thereof having a molecular weight up to about 4000; and (B) a comb polymer of a molecular weight of from 2,000 to 100,000 having (i) carboxylic acid anhydride, free carboxylic acid or its ammonium, alkali or alkaline earth metal salt and (ii) $C_2$–$C_5$ oxyalkylene units or mixtures of said units, wherein said units (i) or (ii) being pendant from the polymer backbone chain and said units (ii) provide the majority of the molecule. The oxyalkylene compound may be selected from (i) oxyalkylene glycols represented by the formula HOAOH or $HO(AO)_nH$ wherein A represents a $C_2$–$C_{10}$ alkylene group, O represents an oxygen atom, and n represents an integer of from 1 to about 80; (ii) oxyalkylene adducts of monoalcohols represented by the formula $RO(AO)_mH$ wherein R represents a $C_1$–$C_7$ alkyl or a $C_5$–$C_6$ cycloalkyl group, A represents a $C_2$–$C_4$ alkylene group, O represents an oxygen atom and m represents an integer of from 1 to about 10; and (iii) oxyalkylene adducts of polyols represented by the formula $Q[(OA)_pOR']_x$ wherein Q represents a $C_3$–$C_{12}$ aliphatic hydrocarbon residual group of a polyhydroxyalkane, each R' independently represents a $C_1$–$C_{14}$ alkyl or cycloalkyl group or hydrogen atom provided at least one R' of said adduct represents a $C_1$–$C_{14}$ alkyl or cycloalkyl group; A represents a $C_2$–$C_4$ alkylene group; O represents an oxygen atom; p represents an integer of from 0 to about 10; and x represents an integer of from 3 to 5; and (iv) mixtures of said oxyalkylene compounds.

Still further exemplary oxyalkylene SRAs suitable for use in the invention can comprise oxyalkylene ether adducts with higher alkylene diols, as described in U.S. Pat. No. 5,618,344 of Kerkar et al., incorporated herein by reference. Other exemplary SRAs, having optional components for air entrainment or air detrainment purposes, are also disclosed in U.S. Pat. No. 5,604,273 of Kerkar et al. (alkylene glycols and copolymers of alkenyl ether and maleic anhydride); U.S. Pat. No. 5,622,558 of Berke et al. (mixture of alkylene glycol and fume silica); U.S. Pat. No. 5,626,663 of Berke et al. (SRA comprising certain alkane diols, e.g., 2-methyl-2,4 pentanediol); U.S. Pat. No. 5,679,150 of Kerkar et al. (oxyalkylene SRA used with betaine to permit air entrainment); U.S. Pat. No. 5,779,788 of Berke et al. (mixture of lower alkyl ether of oxyalkylene adduct with sulfonated organocyclic material)

It is further known in the art to combine oxyalkylene SRAs with alkylene glycols, as discussed for example in U.S. Pat. No. 5,938,835 of Shawl et al., which is incorporated herein by reference. Patent '835 disclosed a mixture of (a) at least one alkyl ether oxyalkylene adduct represented by the formula $RO(AO)_nH$ wherein A is an alkylene (e.g., $C_2$–$C_4$) group, O is an oxygen atom, R is an alkyl group (e.g., $C_3$–$C_5$), and n is an integer from 1 to 3; and (b) an oxyalkylene glycol represented by the formula $HO(AO)_mH$ wherein A is an alkylene radical (e.g., $C_2$–$C_4$), O is an oxygen atom, and m is an integer of 1 to 3. Exemplary SRAs of component (a) include dipropylene glycol t-butyl ether, tripropylene glycol t-butyl ether, and mixtures thereof. Exemplary oxyalkylene glycols of component (b) include dipropylene glycol, tripropylene glycol, and mixtures thereof.

Suitable shrinkage reduction admixtures are available from Grace Construction Products under the ECLIPSE tradename and from MasterBuilders under the TETRA-GUARD tradename.

Other exemplary hydratable cementitious compositions 18 and methods of the present invention optionally, but preferably, further include a water reducing admixture, and in particular high-range water reducing admixtures otherwise known as "superplasticizers." Examples of suitable water-reducing admixtures are lignosulfonic acids and salts or derivatives thereof (e.g., lignin sulfonates), naphthalene sulfonate formaldehyde condensates, melamine sulfonate formaldehydes, polyacrylates, amines and their derivatives, and alkanolamines. The amount of such water reducing admixtures to be used can range from 0.05 to 5.0 weight percent based on dry weight of hydratable cementitious binder in the slab composition 18. Where superplasticizers are used in cementitious compositions, it is preferable to use polycarboxylate copolymers which are comb polymers having a carbon-containing backbone with pendent cement-anchoring members and pendent oxyalkylene groups attached to the backbone. See e.g., U.S. Pat. No. 5,393,343 of Darwin et al.; U.S. Pat. No. 5,728,207 of Darwin et al.; See also U.S. Pat. No. 5,725,657 of Darwin et al.; all of which are incorporated by reference herein.

Other superplasticizers believed to be suitable for use in the invention include U.S. Pat. Nos. 4,471,100 and 5,453,123 and 5,476,885 assigned to Nippon Shokubai Kagaku Kogyo; U.S. Pat. No. 5,100,984 assigned to SIKA AG; U.S. Pat. No. 4,946,904 assigned to Nippon Oil and Fats; U.S. Pat. No. 5,369,198 assigned to Chemie Linz; and U.S. Pat. Nos. 5,670,578 and 5,725,654 and 5,854,386 assigned to ARCO (now Lyondell); all of which are incorporated by reference herein.

Contemplated for use in exemplary method and cementitious compositions of the invention are superplasticizers available from Grace Construction Products under the trade name ADVA®.

Exemplary hydratable cementitious floor slab 18 compositions of the invention optionally, but preferably, include fibers for reinforcing the composition when cured (See e.g., U.S. Pat. No. 6,071,613 of Rieder et al.; U.S. Pat. No. 6,197,423 of Rieder et al.; U.S. Pat. No. 6,240,522 of Berke et al.) and/or include fibers for controlling plastic shrinkage cracking (See e.g., U.S. Pat. No. 5,753,368 of Berke et al.; U.S. Pat. No. 5,399,195 of Hansen et al., disclosing plastic shrinkage control fibers having a diameter of preferably less than 50 microns). Fibers provide a distinct advantage over conventional welded wire fabric or steel reinforcing bars, because the structures which support such fabric or bars have a tendency to puncture or tear the waterproofing membrane. Preferred are fibers that are polymeric (e.g., polypropylene) rather than steel in composition because of their decreased risk of membrane puncture. Fibers may be included in the hydratable cementitious compositions of the invention in the amount of 0.03% to 1.5% (by volume of the concrete).

In further exemplary embodiments of the invention, set accelerating admixtures may be included, in the amount of 0.5–3.0% based on dry weight of hydratable cementitious binder in the floor slab 18 composition. Conventional set accelerators may be employed, such as alkali hydroxides, silicates, fluorosilicates, calcium formate, sodium chloride, calcium chloride, and calcium nitrate and calcium nitrite. Thiocyanates may also be used for this purpose. A set accelerator deemed suitable for the purposes of the present invention is available from Grace Construction Products under the tradename POLARSET®.

The foregoing detailed description of preferred embodiments is provided for illustrative purposes only and is not intended to limit the scope of the invention.

What is claimed is:

1. Method for making a concrete floor structure, comprising:
    applying onto a substrate having a horizontal upward-facing surface a continuous waterproofing membrane having a polymeric film carrier sheet having two major sides and a self-adhering, pressure-sensitive waterproofing adhesive layer disposed on at least one of said two major sides, said pressure-sensitive waterproofing adhesive comprising a synthetic adhesive having an average thickness of 2–60 mils, said waterproofing adhesive layer side being disposed in an upwards direction when said membrane is applied onto said substrate, and said waterproofing membrane further comprising a finely divided particulate layer to protect said pressure-sensitive waterproofing adhesive from foot traffic;
    casting a hydratable mortar or concrete composition, which comprises a hydratable cementitious binder and water in a water/cementitious binder ratio of no less than 0.20 and no greater than 0.45 by weight, onto said waterproofing adhesive layer side of said waterproofing membrane and allowing said composition to bond to and form a horizontal slab upon said membrane, said composition further comprising a polycarboxylate superplasticizer in an amount no less than 0.03 and in an amount no greater than 5.0% based on dry weight of said hydratable cementitious binder in said composition, and said composition further comprising at least one shrinkage reducing admixture in an amount no less than 0.05% and in an amount no greater than 5.0% based on dry weight of said hydratable cementitious binder, said at least one shinkage reducing admixture comprising an oxyalkylene compound;
    applying a water-based adhesive layer onto said composition within 3–90 days after casting said composition onto said membrane; and
    applying a floor covering onto said water-based adhesive layer within 3–90 days after casting said composition onto said membrane.

2. The method of claim 1 wherein said water/cementitious binder ratio is no less than 0.25 and no greater than 0.40.

3. The method of claim 1 wherein said hydratable mortar or concrete composition, when cast into a floor slab and allowed to cure, has a water vapor transmission rate of 3 pounds/1000 squre feet/24 hours at 28 days after casting of the slab.

4. The method of claim 1 wherein said waterproofing membrane further comprises an elastomeric protective coating layer between said finely divided particulate layer and said waterproofing adhesive layer.

5. The method of claim 1 wherein said shrinkage reduction admixture is di-propylene glycol tertiary-butyl ether.

6. The method of claim 1 wherein said polycarboxylate superplasticizer is a comb polymer having a carbon-containing backbone with pendant cement-anchoring members and pendent oxyalkylene groups attached to the backbone.

7. The method of claim 1 wherein said hydratable composition further comprises fibers.

8. The method of claim 7 wherein said fibers have a diameter no greater than 50 microns.

9. The method of claim 1 wherein said carrier sheet of said waterproofing membrane is cross-laminated polyethylene.

10. The method of claim 1 wherein said carrier sheet is 2–4 mils thick.

11. A flooring structure made by the method of claim 1.

12. The method of claim 1 wherein said covering layer is a flooring material selected from tile and carpeting.

13. The method of claim 5 further comprising di-propylene glycol.

14. The method of claim 1 wherein said oxyalkylene compound of said shrinkage reducing admixture is selected from an oxyalkylene glycol; an oxyalkylene ether adduct of an alcohol, glycol, or glycerol; and an ammonium salt of tall oil fatty acid.

15. The method of claim 1 wherein said shrinkage reducing admixture comprises a dialkyl ether derivative.

16. The method of claim 1 wherein said shrinkage reducing admixture comprises a mixture of (a) at least one alkyl ether oxyalkylene adduct represented by the formula $RO(AO)_nH$ wherein A is an alkylene group, O is an oxygen atom, R is an alkyl group, and n is an integer from 1 to 3; and (b) an oxyalkylene glycol represented by the formula $HO(AO)_mH$ wherein A is an alkylene radical, O is an oxygen atom, and m is an integer of 1 to 3.

17. The method of claim 16 wherein component (a) comprises dipropylene glycol t-butyl ether, tripropylene glycol t-butyl ether, or mixtures thereof; and component (b) comprises dipropylene glycol, tripropylene glycol, or mixtures thereof.

18. Method for making a concrete floor structure having a continuous waterproofing sub-slab membrane, comprising:
    applying onto a substrate having a horizontal upward-facing surface a continuous waterproofing membrane having a polymeric film carrier sheet having two major sides and a self-adhering, pressure-sensitive waterproofing adhesive layer disposed on at least one of said two major sides, said waterproofing adhesive comprising a synthetic adhesive having an average thickness of 2–60 mils; said adhesive being selected from butyl rubber based adhesives, polyisobutylene based adhesives, polyisobutyl based adhesives, acrylic based adhesives, vinyl ether based adhesives, styrene-isoprene-styrene based adhesives, styrene-ethylene-butylene-styrene based adhesives, and styrene-butadiene-styrene based adhesives; and said waterproofing adhesive layer side being disposed in an upwards direction when said membrane is applied onto said substrate and having a finely divided particulate layer to protect said adhesive layer from foot traffic; and
    casting a hydratable mortar or concrete composition, which comprises a hydratable cementitious binder and water in a water/cementitious binder ratio of no less than 0.20 and no greater than 0.45 by weight, onto said waterproofing adhesive layer side of said waterproofing membrane and allowing said composition to bond to and form a horizontal slab upon said membrane, said composition further comprising a comb polymer polycarboxylate superplasticizer in an amount no less than 0.03 and in an amount no greater than 5.0% based on dry weight of hydratable cementitious binder in said composition, said comb polymer polycarboxylate superplasticizer having a carbon-containing backbone with pendent cement-anchoring members and pendent oxyalkylene groups; and said mortar or concrete composition further comprising at least one shrinkage reducing admixture in an amount no less than 0.05% and in an amount no greater than 5.0% based on dry weight of said hydratable cementitious binder, said at least one shrinkage reducing admixture being selected from the group consisting of an oxyalkylene glycol, an oxyalkylene ether adduct of an alcohol, glycol, or glycerol, and an ammonium salt of tall oil fatty acid; and said mortar or concrete composition further having a vapor transmission rate equal to or less than 3 pounds/1000 square feet/24 hours at 3–90 days after placement.

19. The method of claim 18 further comprising adding a water-based adhesive coating layer upon said composition, and adding a covering layer over said water-based adhesive coating.

20. The method of claim 18 wherein said shrinkage reducing admixture comprises di-propylene glycol tertiary butyl ether and di-propylene glycol.

* * * * *